US 10,697,937 B2

(12) United States Patent
Yuan et al.

(10) Patent No.: US 10,697,937 B2
(45) Date of Patent: Jun. 30, 2020

(54) MUSIC CORROSION MONITORING METHOD VIA EXCITATION BEAM FORMING AND WEIGHTED IMAGE FUSING (71) Applicant: NANJING UNIVERSITY OF AERONAUTICS AND ASTRONAUTICS, Jiangsu (CN)

(72) Inventors: Shenfang Yuan, Jiangsu (CN); Qiao Bao, Jiangsu (CN); Lei Qiu, Jiangsu (CN); Fangyu Guo, Jiangsu (CN); Yuanqiang Ren, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 0 days.

(21) Appl. No.: 16/346,126

(22) PCT Filed: Dec. 19, 2017

(86) PCT No.: PCT/CN2017/117066
§ 371 (c)(1),
(2) Date: Apr. 30, 2019

(87) PCT Pub. No.: WO2019/113994
PCT Pub. Date: Jun. 20, 2019

(65) Prior Publication Data
US 2020/0132635 A1 Apr. 30, 2020

(30) Foreign Application Priority Data
Dec. 14, 2017 (CN) .......................... 2017 1 1337794

(51) Int. Cl.
G01N 29/06 (2006.01)
G01N 29/04 (2006.01)
G06K 9/62 (2006.01)

(52) U.S. Cl.
CPC ......... *G01N 29/069* (2013.01); *G01N 29/041* (2013.01); *G06K 9/6255* (2013.01); *G06K 9/6288* (2013.01); *G01N 2291/023* (2013.01)

(58) Field of Classification Search
USPC ........................................................... 73/602
See application file for complete search history.

(56) References Cited

U.S. PATENT DOCUMENTS

| 2012/0119732 | A1 | 5/2012 | Rose et al. |
| 2013/0180337 | A1* | 7/2013 | Hart, Jr. ............... G01N 29/069 73/592 |
| 2018/0149019 | A1* | 5/2018 | Bose ................... E21B 47/0005 |

FOREIGN PATENT DOCUMENTS

| CN | 101865758 | 10/2010 |
| CN | 103698748 | 4/2014 |

(Continued)

OTHER PUBLICATIONS

"International Search Report (Form PCT/ISA/210)", dated Aug. 31, 2018, pp. 1-4.

*Primary Examiner* — Tarun Sinha
(74) *Attorney, Agent, or Firm* — JCIPRNET (57) ABSTRACT The present invention discloses a Multiple Signal Classification (MUSIC) corrosion monitoring method via excitation beam forming and weighted image fusing. Because damage-related scattering signals are weak and precision of the MUSIC algorithm is affected, the present invention first introduces excitation beam forming and two arrays into the MUSIC method, to enhance scattering signals of corrosive damage and improve their signal-to-noise ratios. Then, the two arrays serve as an excitation array or a sensor array in turn, by assigning weight to fused corrosive damage images of the two arrays, monitoring of corrosive damage in blind zones of the one-dimensional linear arrays is realized. Finally, factors related to the corrosive damage are calcu- (Continued)

lated based on eigenvalues of covariance matrixes of array signals, to determine the depth of the corrosive damage. The present invention improves the positioning precision in the MUSIC corrosion monitoring, widens a monitoring range of the conventional one-dimensional linear array, and realizes evaluation of the depth of the corrosive damage, thus has wide application prospects in actual monitoring of corrosive damage in an aviation structure.

16 Claims, 4 Drawing Sheets

(56) References Cited

FOREIGN PATENT DOCUMENTS

| | | |
|---|---|---|
| CN | 104502452 | 4/2015 |
| CN | 104965025 | 10/2015 |
| CN | 105372327 | 3/2016 |
| CN | 105717198 | 6/2016 |
| CN | 107045003 | 8/2017 |

* cited by examiner

MUSIC CORROSION MONITORING METHOD VIA EXCITATION BEAM FORMING AND WEIGHTED IMAGE FUSING

CROSS-REFERENCE TO RELATED APPLICATION

This application is a 371 application of the international PCT application serial no. PCT/CN2017/117066, filed on Dec. 19, 2017, which claims the priority benefit of China application no. 201711337794.0, filed on Dec. 14, 2017. The entirety of each of the above-mentioned patent applications is hereby incorporated by reference herein and made a part of this specification.

BACKGROUND OF THE INVENTION

Technical Field

The present invention relates to the field of health monitoring technology for an engineering structure, and in particular, to a MUSIC corrosive damage monitoring method.

Description of Related Art

Currently, there are more than 14,000 aging aircrafts worldwide, which generally require more frequent inspection and maintenance. A large number of aging aircrafts are subjected to structural corrosion as a frequently occurring damage. According to statistics collected by the US Federal Aviation Administration, the maintenance cost for corrosion in aging aircrafts accounts for 30% of the total maintenance cost. Therefore, monitoring of corrosive damage is an important subject in current structure health monitoring.

Because the Lamb wave can be propagated for a long distance and is sensitive to small damage, a structure health monitoring method based on the Lamb wave has a desirable application prospect. Because a sensor array is easily disposed on the structure and has a directional scanning function, an array signal processing method is gradually introduced into the field of structure health monitoring. In recent years, the MUSIC (Multiple Signal Classification) algorithm is a representative among various algorithms. The MUSIC algorithm belongs to a subspace algorithm. The elementary concept of this algorithm is performing eigenvalue decomposition for a covariance matrix of data output by any array, to obtain a signal subspace corresponding to a signal component and a noise subspace orthogonal to the signal component, and then estimating signal parameters according to orthogonality between the two subspaces.

During MUSIC corrosive damage monitoring, corrosive damage cannot produce the Lamb wave, and therefore, it is required to actively use Lamb waves and use scattering signals of the corrosive damage to implement positioning and degree estimation. However, the scattering signals of the corrosive damage are rather weak and have low signal-to-noise ratios, resulting in low positioning precision of the MUSIC method. Secondly, a one-dimensional uniform linear array is used to receive the Lamb waves in a common MUSIC damage positioning method. However, the one-dimensional linear array has monitoring blind zones in ranges near 0° and 180°. If the corrosive damage occurs in the blind zones, that is, in the ranges of 0° to 30° and 150° to 180°, positioning of the corrosive damage fails. In addition, the present MUSIC algorithm cannot estimate the degree of the corrosive damage.

SUMMARY OF THE INVENTION

To solve the technical problems mentioned in the background, the present invention aims to provide a MUSIC corrosion monitoring method via excitation beam forming and weighted image fusing, so as to enhance scattering signals regarding corrosive damage and improve their signal-to-noise ratios, eliminate monitoring blind zones of the conventional one-dimensional uniform linear array, and implement positioning and depth evaluation of the corrosive damage.

To achieve the foregoing objectives, the present invention adopts the following technical solutions:

The MUSIC corrosion monitoring method via excitation beam forming and weighted image fusing includes the following steps:

(1) when a structure is in a healthy state, driving arrays A and S in turn to excite Lamb waves, collecting response signals from a corresponding sensor array, and recording them as reference signals;

(2) during monitoring of corrosive damage, driving the arrays A and S in turn to excite Lamb waves, collecting response signals from a corresponding sensor array, recording them as monitoring signals, subtracting the reference signals from the monitoring signals, and recording a subtraction result as scattering signals of the corrosive damage;

(3) obtaining a corrosion imaging result based on a MUSIC algorithm and the scattering signals of the corrosive damage, and searching the corrosion imaging result for a peak point which indicates an initially estimated position of the corrosive damage;

(4) calculating, according to the initially estimated position, delays of excitation array elements with respect to a position of the corrosive damage, moving the scattering signals of the corrosive damage forward or backward according to the delays, and adding up these scattering signals of the corrosive damage to obtain an enhanced scattering signal of the corrosive damage;

(5) putting the enhanced scattering signal of the corrosive damage into the MUSIC algorithm, to obtain a corresponding corrosion imaging result and the largest eigenvalue of a covariance matrix of the scattering signals;

(6) setting corresponding weights for corrosion imaging results obtained in the cases where the arrays A and S each serve as an excitation source array, fusing the two corrosion imaging results according to the weights, and searching a fused image for a peak point which is the position of the corrosive damage; and (7) adding up the largest eigenvalues of the covariance matrixes of the scattering signals according to the weights obtained in step (6), to calculate a corrosion factor, and evaluating a depth of the corrosive damage by using the corrosion factor.

Further, the arrays A and S are both one-dimensional uniform linear arrays, and each array has 2N+1 array elements, where each array element in the array A is denoted by $A_i$, each array element in the array S is denoted by $S_i$, and i=−N, −(N−1), . . . , 0, . . . , N−1, N.

Further, in step (2), when the array A is driven to excite the Lamb waves, array elements in the array A are successively used as an excitation to obtain the corresponding scattering signals of the corrosive damage:

$$X_i^d(t) = A(r,\theta)x_a(t) + N(t)$$

where in the foregoing formula, $X_i^1(t)$ indicates a vector formed by scattering signals obtained by all array elements in the array S when the array elements $A_i$ in the array A are used as excitations; N(t) indicates a vector formed by background noise of array element acquisition channels in the array S; $x_a(t)$ indicates a scattering signal of the corrosive damage obtained by a reference array element in the array S; A(r,θ) indicates a steering vector; for element $a_q(r,\theta)=\exp(-j\omega_0\tau_q)$ in A(r,θ), q=N, -(N-1), ..., 0, ..., N-1, N, $\omega_0$ is the center frequency of a transmitted signal, j is an imaginary number unit, and $$\tau_q = \frac{\sqrt{r^2 + q^2d^2 - 2r(qd)\cos\theta} - r}{c},$$

d being a space between adjacent array elements in an array, c being a signal transmission speed, and r and θ respectively being a distance and an angle of the damage with respect to the array S; and t indicates the time of a signal; and a process of driving the array S to excite the Lamb waves is identical with that of the array A.

Further, in step (3), a covariance matrix $\hat{R}$ of $X_i^d(t)$ is first calculated as follows:

$$\hat{R} = \frac{1}{K}(X_i^d)\cdot(X_i^d)^H$$

where in the foregoing formula, the superscript H indicates Hermitian transpose, and K indicates the length of a collected signal;

then, eigenvalue decomposition is performed for $\hat{R}$:

$$\hat{R}=U_S\Sigma_S U_S^H + U_N\Sigma_N U_N^H$$

where in the foregoing formula, $U_S$ and $U_N$ indicate a signal subspace and a noise subspace respectively, $\Sigma_S$ indicates the largest eigenvalue corresponding to the signal subspace, and $\Sigma_N$ indicates the smallest eigenvalue corresponding to the noise subspace; and spatial spectrum estimation based on the MUSIC algorithm is as follows:

$$P_{MUSIC}(r, \theta) = \frac{1}{A^H(r, \theta)U_N U_N^H A(r, \theta)}$$

where an obvious crest exists in a spatial spectrum diagram, which is an initially estimated position of the corrosive damage.

Further, in step (4), a distance from each array element of the excitation source array to the initially estimated position of the corrosive damage is calculated as follows:

$$r_p^A = \sqrt{(pd-r_1\cos\theta_1)^2 + (l-r_1\sin\theta_1)^2}, \; p=N, -(N-1), \ldots, 0, \ldots, N-1, N$$

where in the foregoing formula, l indicates a space between the excitation source array and the sensor array, $r_1$ indicates distance information related to the initially estimated position of the corrosive damage, and $\theta_1$ indicates direction information related to the initially estimated position of the corrosive damage;

a delay from each array element of the excitation source array to the corrosive damage is calculated as follows:

$$t_p = \frac{r_p^A - r_a^A}{c}$$

where in the foregoing formula, $r_a^A$ indicates a distance from a reference array element in the excitation source array to the initially estimated position of the corrosive damage; and the scattering signals of the corrosive damage are added up to obtain an enhanced scattering signal of the corrosive damage:

$$X^d(t) = \sum_{p=-N}^{p=N} X_p^d(t) \cdot e^{-j\omega_0 t_p}$$

Further, in step (6), if corrosive damage positioned by one of the corrosion imaging results is located in a monitoring blind zone of its sensor array, the weight of this corrosion imaging result is set to 0, and the weight of the other corrosion imaging result is set to 1; and if corrosive damage positioned by the two corrosion imaging results is both located in a monitorable zone of their respective sensor arrays, the weights of the two corrosion imaging results are both set to 0.5.

Further, in step (7), a corrosion factor is calculated according to the following formula:

$$CI = \left(\frac{u_A}{u_S \times 10^5}\right)^2 \cdot \lambda_{max}$$

where in the foregoing formula, $\lambda_{max}$ indicates a result of adding up the largest eigenvalues of the covariance matrixes of the scattering signals according to the weights, and $u_A$ and $u_S$ respectively indicate peaks of excitation signals and scattering signals of the corrosion.

Further, in step (7), the depth of the corrosive damage is calculated by using the following formula:

$$D=1.29 \times CI+0.115 \text{ (cm)}.$$

The foregoing technical solutions bring about the following beneficial effects:

The present invention efficiently improves the precision of positioning corrosive damage based on the MUSIC algorithm; can monitor corrosive damage in a monitoring blind zone of a one-dimensional linear array, thus widening a monitoring range; and can further evaluate the depth of the corrosive damage, thus being efficiently applicable to actual monitoring of corrosive damage in an aviation structure.

DETAILED DESCRIPTION OF THE EMBODIMENTS

The technical solutions of the present invention are described in detail below with reference to the accompanying drawings.

Figure 1:
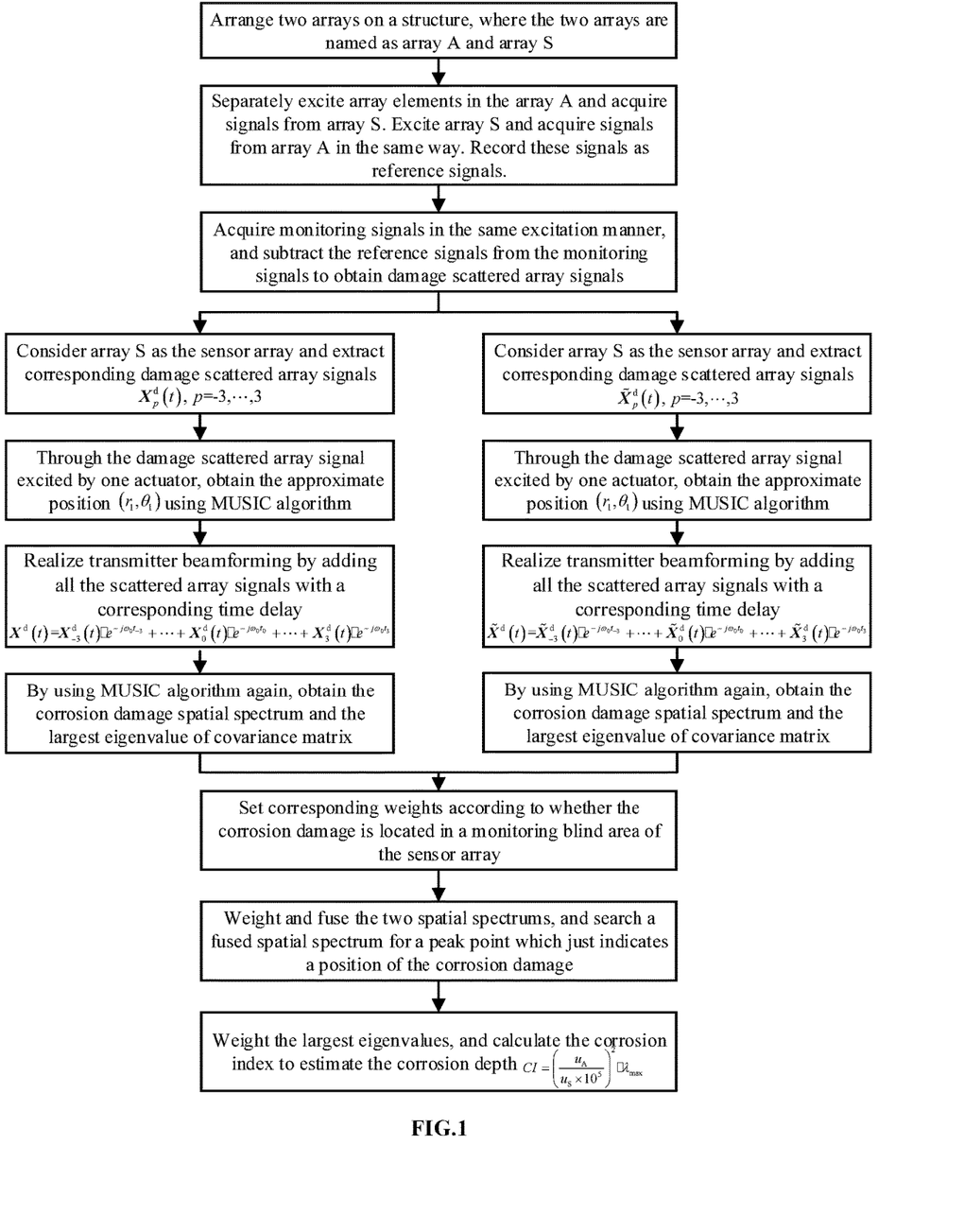
FIG. 1 is a flowchart of a method of the present invention.

The present invention provides a MUSIC corrosion monitoring method via excitation beam forming and weighted image fusing. As shown in FIG. 1, a process is as follows:

Step 1: When a structure is in a healthy state, arrays A and S are driven in turn to excite Lamb waves, and response signals from a corresponding sensor array are collected and recorded as reference signals.

Step 2: During monitoring of corrosive damage, the arrays A and S are driven in turn to excite Lamb waves, and response signals from a corresponding sensor array are collected and recorded as monitoring signals. The reference signals are subtracted from the monitoring signals, and a subtraction result is recorded as scattering signals of the corrosive damage.

Step 3: A corrosion imaging result is obtained based on a MUSIC algorithm and the scattering signals of the corrosive damage, and is searched for a peak point which indicates an initially estimated position of the corrosive damage.

Step 4: Delays of excitation array elements with respect to a position of the corrosive damage are calculated according to the initially estimated position, the scattering signals of the corrosive damage are moved forward or backward according to the delays, and these scattering signals of the corrosive damage are added up to obtain an enhanced scattering signal of the corrosive damage.

Step 5: The enhanced scattering signal of the corrosive damage is put into the MUSIC algorithm, to obtain a corresponding corrosion imaging result and the largest eigenvalue of a covariance matrix of the scattering signals.

Step 6: Corresponding weights are set for corrosion imaging results obtained in the cases where the arrays A and S each serve as an excitation source array, the two corrosion imaging results are fused according to the weights, and a fused image is searched for a peak point which is the position of the corrosive damage.

Step 7: The largest eigenvalues of the covariance matrixes of the scattering signals are added up according to the weights obtained in step (6), to calculate a corrosion factor, and a depth of the corrosive damage is evaluated by using the corrosion factor.

The technical solutions of the present invention are further described by using specific embodiments.

Figure 2:
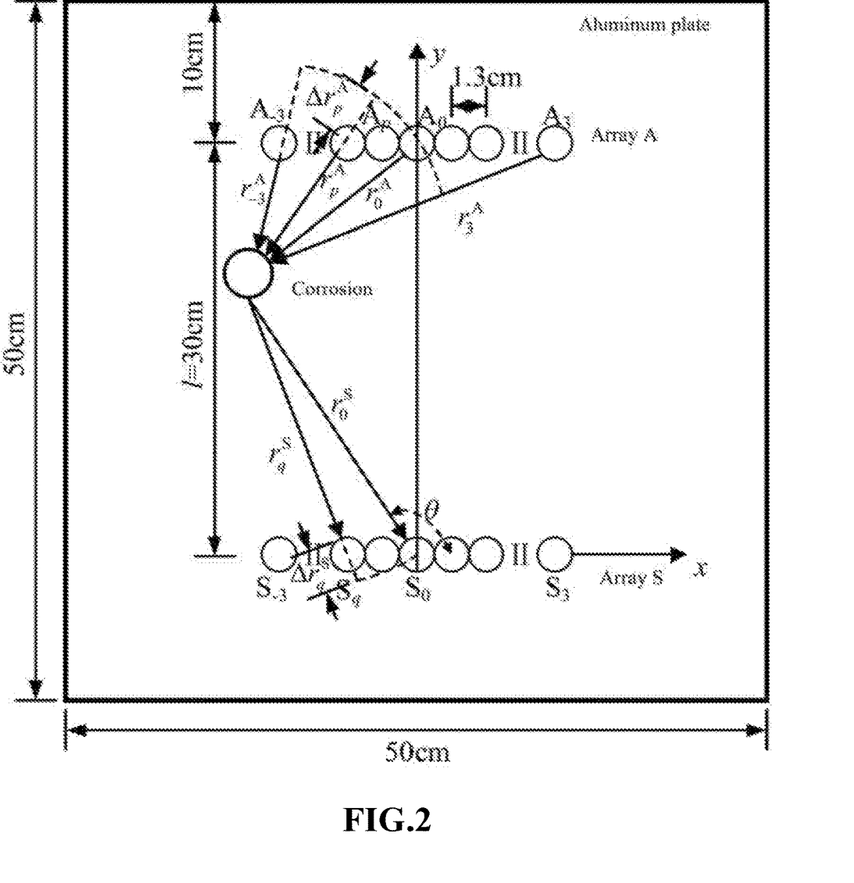
FIG. 2 is a schematic diagram showing arrangement of an aluminum plate and two arrays in an embodiment.

As shown in FIG. 2, the dimensions of an aluminum plate are 50 cm×50 cm×0.3 cm. Dual arrays formed of two one-dimensional uniform linear arrays are arranged on the structure surface. The upper array is named an array A of which corresponding array elements are named PZT $A_{-3}$, . . . , and PZT $A_3$. The lower array is named an array S of which corresponding array elements are named PZT $S_{-3}$, . . . , and PZT $S_3$. A space between the array elements in each array is 1.3 cm, and a space between the two arrays is 30 cm. In the experiment, corrosive damage is produced by the reaction between dilute hydrochloric acid and aluminum, and is positioned at coordinates (220 cm, 120°); and the diameter of the corrosion is 1.3 cm. There are five corrosion phases. After each corrosion phase, the depth of the corrosive damage is measured by using a C-ultrasound scanner, to verify a depth estimation method for the corrosive damage in the present invention. The measured depths of the corrosive damage in the five phases are 0.012 cm, 0.027 cm, 0.037 cm, 0.049 cm, and 0.059 cm.

1. Acquisition of Scattering Array Signals Regarding Corrosive Damage 1.1 Acquisition of Reference Signals When the aluminum plate is in a healthy state, PZT $A_{-3}$, . . . , and PZT $A_3$ are separately driven in order to excite Lamb waves, Lamb-wave response signals accepted by PZT $S_{-3}$, . . . , and PZT $S_3$ are collected. Then, PZT $S_{-3}$, . . . , and PZT $S_3$ are separately driven in order to excite Lamb waves, and Lamb-wave response signals accepted by PZT $A_{-3}$, . . . , and PZT $A_3$ are collected. These signals are stored as reference signals.

1.2 Acquisition of Scattering Signals Regarding Corrosive Damage

During monitoring of the corrosive damage, PZT $A_{-3}$, . . . , and PZT $A_3$ are separately driven in order to excite Lamb waves, and Lamb-wave response signals accepted by PZT $S_{-3}$, . . . , and PZT $S_3$ are collected. Then, PZT $S_{-3}$, . . . , and PZT $S_3$ are separately driven in order to excite Lamb waves, and Lamb-wave response signals accepted by PZT $A_{-3}$, . . . , and PZT $A_3$ are collected. These signals are stored as monitoring signals. The reference signals are subtracted from the monitoring signals, to obtain scattering signals of the corrosive damage.

2. MUSIC Corrosion Imaging Via the Array A and Excitation Beam Forming

The array A is used as an excitation source array, and the array S is used as a sensor array.

2.1 Initial Estimation of the Position of the Corrosive Damage

Figure 3:
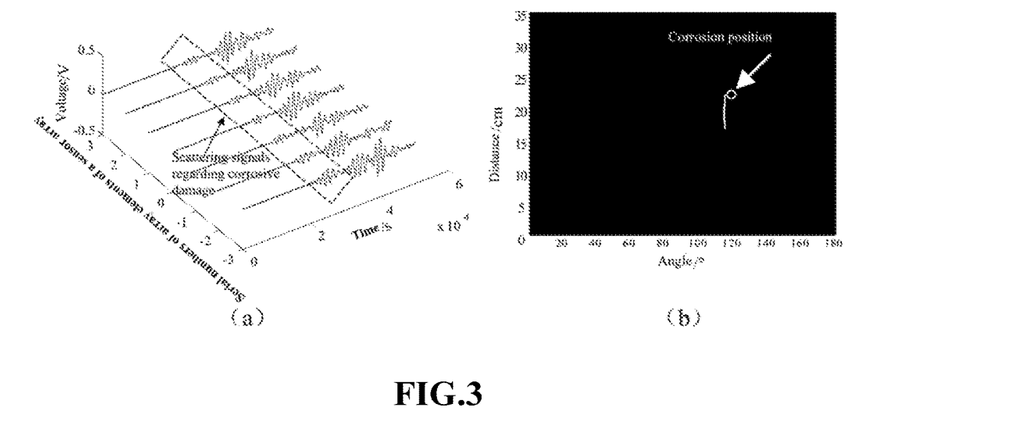
FIG. 3 is a diagram showing a result of MUSIC corrosive damage positioning by using a single excitation source in an embodiment, where (a) is a diagram showing scattering array signals regarding corrosive damage under the effect of the single excitation source, and (b) is a spatial spectrum diagram.

PZT $A_0$ gives an excitation, and response scattering array signals from PZT $S_{-3}$, . . . , and PZT $S_3$ are put into the MUSIC algorithm, as shown in (a) of FIG. 3. According to a near-field model related to propagation of a Lamb wave signal, the scattering array signal $X_0^d(t)$ may be denoted as follows:

$$X_0^d(t) = A(r,\theta)x_0(t) + N(t) \quad (1)$$

In the formula, $X_0^d(t) = [x_{-3}(t), x_{-2}(t), \ldots x_3(t)]^T$; $A(r,\theta) = [a_{-3}(r,\theta), a_{-2}(r,\theta), \ldots, a_3(r,\theta)]^T$; $N(t) = [n_{-3}(t), n_{-2}(t), \ldots, n_3(t)]^T$; and $x_{-3}(t), x_{-2}(t), \ldots, x_3(t)$ are scattering signals corresponding to PZT $S_{-3}$, . . . , and PZT $S_3$, where $x_0(t)$ indicates a scattering signal related to a reference array element, $N(t)$ indicates background noise of a corresponding acquisition channel, and $A(r,\theta)$ indicates a steering vector. A calculating formula of the steering vector is as follows:

$$a_q(r, \theta) = \exp(-j\omega_0 \tau_q), q = -3, -2, \ldots, 3 \quad (2)$$

$$\tau_q = \frac{\sqrt{r^2 + q^2 d^2 - 2r(qd)\cos\theta} - r}{c} \quad (3)$$

In the foregoing formulas, $\omega_0$ is the center frequency of a transmitted signal, $\tau_q$ indicates a time delay in wave arrival at each array element of the sensor array in comparison with that at the reference array element, r and θ respectively indicate a distance and an angle of the damage with respect to the sensor array, c indicates a signal transmission speed, and d indicates a space between array elements.

A covariance matrix $\hat{R}$ of $X_0^d$ is calculated as follows:

$$\hat{R} = \frac{1}{K}(X_i^d) \cdot (X_i^d)^H \quad (4)$$

In the foregoing formula, $(X_0^d)^H$ the Hermitian transpose of $X_0^d$, and K indicates the length of a collected signal.

Eigenvalue decomposition is performed for $\hat{R}$:

$$\hat{R} = U_S \Sigma_S U_S^H + U_N \Sigma_N U_n^H \quad (5)$$

In the foregoing formula, $U_S$ and $U_N$ indicate a signal subspace and a noise subspace respectively, $\Sigma_S$ indicates the largest eigenvalue corresponding to the signal subspace, and $\Sigma_N$ indicates the smallest eigenvalue corresponding to the noise subspace.

A spatial spectrum estimation formula based on the MUSIC algorithm is as follows:

$$R_{MUSIC}(r, \theta) = \frac{1}{A^H(r, \theta) U_N U_N^H A(r, \theta)} \quad (6)$$

A search in two dimensions of azimuth and distance is regionally done, where the step sizes of the search in azimuth and distance are respectively 1° and 1 mm. A diagram of a two-dimensional spatial spectrum is obtained according to the formula (6), as shown in (b) of FIG. 3. An obvious crest exists in the spatial spectrum diagram, which indicates a position of the corrosive damage. The x-coordinate denotes an arrival direction of a signal source, which shows initial estimation $\theta_1$ of a direction of the corrosive damage. The y-coordinate denotes a distance to the signal source, which shows initial estimation $r_1$ of the direction of the corrosive damage.

2.2 Excitation Beam Forming

After the initially estimated position of the corrosive damage is obtained, a distance from each array element in the excitation source array to the initially estimated position can be calculated as follows:

$$r_p^A = \sqrt{(pd - r_1 \cos\theta_1)^2 + (l - r_1 \sin\theta_1)^2}, p = -3, \ldots, 3 \quad (7)$$

In the formula, p indicates the pth array element in the excitation source array, and l indicates a space between the two arrays. In comparison with the reference array element, a delay from each array element in the excitation source array to the corrosive damage is calculated as follows:

$$t_p = \frac{r_p^A - r_0^A}{c} \quad (8)$$

In the formula, $r_0^A$ indicates a distance from the reference array element in the excitation source array to the initially estimated position. The response signals from the corresponding sensor array are moved forward or backward according to the calculated delays, such that the Lamb waves excited by the array elements in the excitation source array virtually arrive at the corrosive damage at the same time, to obtain a focused scattering signal of the corrosive damage:

$$X^d(t) = X_{-3}^d(t) \square e^{-j\omega_0 t_{-3}} + X_p^d(t) \square e^{-j\omega_0 t_p} + \ldots + X_3^d(t) \square e^{-j\omega_0 t_3} \quad (9)$$

In the formula, $X_p^d(t)$ indicates a scattering array signal collected in the case where the pth array element in the excitation source array gives an excitation. The focused scattering array signal of the corrosive damage is shown in (a) of FIG. 4.

2.3 Re-Estimation of the Corrosive Damage

The focused scattering array signal of the corrosive damage obtained in sub-step 2.2 is put into the MUSIC algorithm, and a new diagram of a two-dimensional spatial spectrum can be obtained according to sub-step 2.1. As shown in (b) of FIG. 4, an accurate direction and distance related to the corrosive damage can be obtained.

3. MUSIC Corrosion Imaging Via the Array S and Excitation Beam Forming

The array S is used as an excitation source array, and the array A is used as a sensor array. The MUSIC algorithm based on excitation beam forming is applied through sub-steps identical with those in step 2, to also obtain a corrosive damage imaging result in the case where the array A is the sensor array, as shown in (a) of FIG. 5.

4. Weighted Image Fusing

Figure 4:
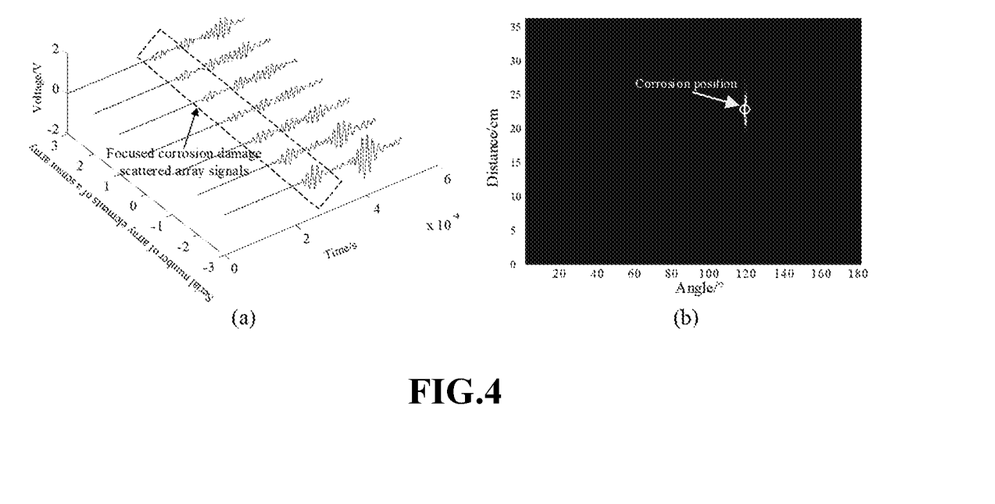
FIG. 4 shows a result of MUSIC corrosive damage positioning via excitation beam forming in an embodiment, where (a) is a diagram showing a focused scattering array signal regarding corrosive damage, and (b) is a spatial spectrum diagram.
Figure 5:
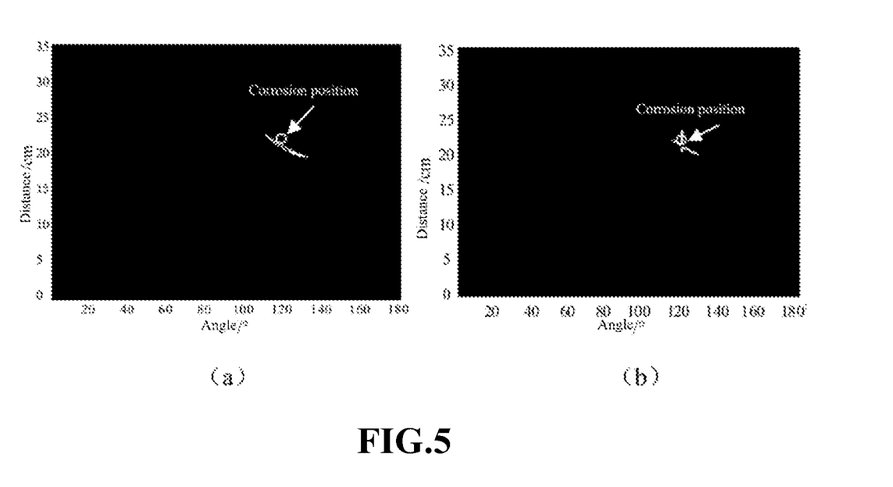
FIG. 5 is a spatial spectrum diagram obtained after weighting and fusing in an embodiment, where (a) is a spatial spectrum diagram when an array S serves as an excitation source array, and (b) shows a spatial spectrum obtained after weighting and fusing.

As shown in (b) of FIG. 4 and (a) of FIG. 5, the corrosive damage is located in a monitorable zone of the two arrays. Therefore, weights of corrosive damage images obtained from the former and latter processes are set to 0.5 and 0.5 respectively. An imaging result obtained after adding and fusing is identical with that in (b) of FIG. 5. A fused image is search for a peak point which is an accurate position of the corrosive damage.

5. Depth Estimation of the Corrosive Damage

Figure 6:
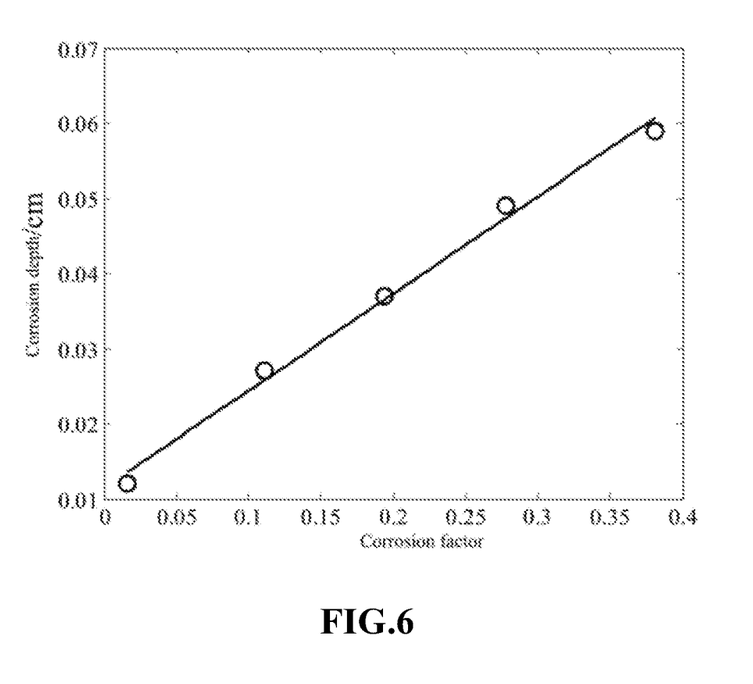
FIG. 6 is a diagram showing a relationship between a corrosion factor and a corrosion depth in an embodiment.

The largest eigenvalues obtained from the two processes are added up according to the weights in step 4, to finally obtain the largest eigenvalues of the five corrosive damage phases, which are respectively 0.0189, 0.1304, 0.2285, 0.3268 and 0.4478. In this experiment, the peak of the excitation signals occurs in the voltage of 70V, and the peak of the scattering signals of the corrosive damage occurs in the voltage of 0.35V. Corrosion factors in the five corrosion phases can be calculated by using a corrosion factor calculation formula, as shown in FIG. 6. The measured corrosion depths in the five phases are 0.012 cm, 0.027 cm, 0.037 cm, 0.049 cm and 0.059 cm. A relationship between the corrosion depth D and the corrosion factor can be obtained as follows by means of linear fitting:

$$D = 1.29 \times CI + 0.115 \text{ (cm)} \quad (10)$$

According to the formula (10), the depth of the corrosive damage can be estimated based on the corrosion factors.

The foregoing embodiment merely describes the technical idea of the present invention, but is not intended to limit the protection scope of the present invention. Any modification made based on the technical solutions according to the technical idea provided by the present invention falls within the protection scope of the present invention.

What is claimed is:

1. A Multiple Signal Classification (MUSIC) corrosion monitoring method via excitation beam forming and weighted image fusing, comprising the following steps:

(1) when a structure is in a healthy state, driving arrays A and S in turn to excite Lamb waves, collecting response signals from a corresponding sensor array, and recording them as reference signals;

(2) during monitoring of corrosive damage, driving the arrays A and S in turn to excite Lamb waves, collecting response signals from the corresponding sensor array, recording them as monitoring signals, subtracting the reference signal from the monitoring signal, and recording a subtraction result as scattering signals of the corrosive damage;

(3) obtaining a corrosion imaging result based on a MUSIC algorithm and the scattering signals of the corrosive damage, and searching the corrosion imaging result for a peak point which indicates an initially estimated position of the corrosive damage;
(4) calculating, according to the initially estimated position, delays of excitation array elements with respect to a position of the corrosive damage, moving the scattering signals of the corrosive damage forward or backward according to the delays, and adding up these scattering signals of the corrosive damage to obtain an enhanced scattering signal of the corrosive damage;
(5) putting the enhanced scattering signal of the corrosive damage into the MUSIC algorithm, to obtain a corresponding corrosion imaging result and the largest eigenvalue of a covariance matrix of the scattering signals;
(6) setting corresponding weights for corrosion imaging results obtained in the cases where the arrays A and S each serve as an excitation source array, fusing the two corrosion imaging results according to the weights, and searching a fused image for a peak point which is the position of the corrosive damage; and
(7) adding up the largest eigenvalues of the covariance matrixes of the scattering signals according to the weights obtained in step (6), to calculate a corrosion factor, and estimating a depth of the corrosive damage by using the corrosion factor.

2. The MUSIC corrosion monitoring method according to claim 1, wherein the arrays A and S are both one-dimensional uniform linear arrays, each array has 2N+1 array elements, each array element in the array A is denoted by $A_i$, each array element in the array S is denoted by $S_i$, and i=-N, -(N-1), . . . , 0, . . . , N-1, N.

3. The MUSIC corrosion monitoring method according to claim 2, wherein in step (2), when the array A is driven to excite the Lamb waves, array elements in the array A are successively used as an excitation to obtain the corresponding scattering signals of the corrosive damage:

$$X_i^d(t)=A(r,\theta)x_a(t)+N(t)$$

in the foregoing formula, $X_i^d(t)$ indicates a vector formed by scattering signals obtained by all array elements in the array S when the array elements $A_i$ in the array A are used as excitations; N(t) indicates a vector formed by background noise of array element acquisition channels in the array S; $x_a(t)$ indicates a scattering signal of the corrosive damage obtained by a reference array element in the array S; $A(r,\theta)$ indicates a steering vector; for element $a_q(r,\theta)=\exp(-j\omega_0\tau_q)$ in $A(r,\theta)$, q=N,-(N-1), . . . , 0, . . . , N-1, N, $\omega_0$ is the center frequency of a transmitted signal, j is an imaginary number unit, and $$\tau_q = \frac{\sqrt{r^2 + q^2 d^2 - 2r(qd)\cos\theta} - r}{c},$$

d being a space between adjacent array elements in an array, c being a signal transmission speed, and r and θ respectively being a distance and an angle of the damage with respect to the array S; and t indicates the time of a signal; and
a process of driving the array S to excite the Lamb waves is identical with that of the array A.

4. The MUSIC corrosion monitoring method according to claim 3, wherein in step (3), a covariance matrix $\hat{R}$ of $X_i^d(t)$ is first calculated as follows:

$$\hat{R} = \frac{1}{K}(X_i^d)\cdot(X_i^d)^H$$

in the foregoing formula, the superscript H indicates Hermitian transpose, and K indicates the length of a collected signal;
then, eigenvalue decomposition is performed for $\hat{R}$:

$$\hat{R}=U_S\Sigma_S U_S^H+U_N\Sigma_N U_N^H$$

in the foregoing formula, $U_S$ and $U_N$ indicate a signal subspace and a noise subspace respectively, $\Sigma_S$ indicates the largest eigenvalue corresponding to the signal subspace, and $\Sigma_N$ indicates the smallest eigenvalue corresponding to the noise subspace; and
spatial spectrum estimation based on the MUSIC algorithm is as follows:

$$R_{MUSIC}(r, \theta) = \frac{1}{A^H(r, \theta)U_N U_N^H A(r, \theta)}$$

an obvious crest exists in a spatial spectrum diagram, which is the initially estimated position of the corrosive damage.

5. The MUSIC corrosion monitoring method according to claim 4, wherein in step (4), a distance from each array element of the excitation source array to the initially estimated position of the corrosive damage is calculated as follows:

$$r_p^A=(pd-r_1\cos\theta_1)^2+(l-r_1\sin\theta_1)^2,$$
$$p=N, -(N-1), \ldots, 0, \ldots, N-1, N$$

in the foregoing formula, l indicates a space between the excitation source array and the sensor array, $r_1$ indicates distance information related to the initially estimated position of the corrosive damage, and $\theta_1$ indicates direction information related to the initially estimated position of the corrosive damage;
a delay from each array element of the excitation source array to the corrosive damage is calculated as follows:

$$t_p = \frac{r_p^A - r_0^A}{c}$$

in the foregoing formula, $r_a^A$ indicates a distance from a reference array element in the excitation source array to the initially estimated position of the corrosive damage; and
the scattering signals of the corrosive damage are added up to obtain an enhanced scattering signal of the corrosive damage:

$$X^d(t) = \sum_{p=-N}^{p=N} X_p^d(t)\cdot e^{-j\omega_0 t_p}.$$

6. The MUSIC corrosion monitoring method according to claim 1, wherein in step (6), if corrosive damage positioned by one of the corrosion imaging results is located in a monitoring blind zone of its sensor array, the weight of this corrosion imaging result is set to 0, and the weight of the other corrosion imaging result is set to 1; and if corrosive damage positioned by the two corrosion imaging results is both located in a monitorable zone of their respective sensor arrays, the weights of the two corrosion imaging results are both set to 0.5.

7. The MUSIC corrosion monitoring method according to claim 1, wherein in step (7), a corrosion factor is calculated according to the following formula:

$$CI = \left(\frac{u_A}{u_S \times 10^5}\right)^2 \cdot \lambda_{max}$$

in the foregoing formula, $\lambda_{max}$ indicates a result of adding up the largest eigenvalues of the covariance matrixes of the scattering signals according to the weights, and $u_A$ and $u_S$ respectively indicate peaks of excitation signals and scattering signals of the corrosion.

8. The MUSIC corrosion monitoring method according to claim 7, wherein in step (7), the depth of the corrosive damage is calculated by using the following formula:

$$D=1.29 \times CI+0.115 \text{ (cm)}.$$

9. The MUSIC corrosion monitoring method according to claim 2, wherein in step (6), if corrosive damage positioned by one of the corrosion imaging results is located in a monitoring blind zone of its sensor array, the weight of this corrosion imaging result is set to 0, and the weight of the other corrosion imaging result is set to 1; and if corrosive damage positioned by the two corrosion imaging results is both located in a monitorable zone of their respective sensor arrays, the weights of the two corrosion imaging results are both set to 0.5.

10. The MUSIC corrosion monitoring method according to claim 3, wherein in step (6), if corrosive damage positioned by one of the corrosion imaging results is located in a monitoring blind zone of its sensor array, the weight of this corrosion imaging result is set to 0, and the weight of the other corrosion imaging result is set to 1; and if corrosive damage positioned by the two corrosion imaging results is both located in a monitorable zone of their respective sensor arrays, the weights of the two corrosion imaging results are both set to 0.5.

11. The MUSIC corrosion monitoring method according to claim 4, wherein in step (6), if corrosive damage positioned by one of the corrosion imaging results is located in a monitoring blind zone of its sensor array, the weight of this corrosion imaging result is set to 0, and the weight of the other corrosion imaging result is set to 1; and if corrosive damage positioned by the two corrosion imaging results is both located in a monitorable zone of their respective sensor arrays, the weights of the two corrosion imaging results are both set to 0.5.

12. The MUSIC corrosion monitoring method according to claim 5, wherein in step (6), if corrosive damage positioned by one of the corrosion imaging results is located in a monitoring blind zone of its sensor array, the weight of this corrosion imaging result is set to 0, and the weight of the other corrosion imaging result is set to 1; and if corrosive damage positioned by the two corrosion imaging results is both located in a monitorable zone of their respective sensor arrays, the weights of the two corrosion imaging results are both set to 0.5.

13. The MUSIC corrosion monitoring method according to claim 2, wherein in step (7), a corrosion factor is calculated according to the following formula:

$$CI = \left(\frac{u_A}{u_S \times 10^5}\right)^2 \cdot \lambda_{max}$$

in the foregoing formula, $\lambda_{max}$ indicates a result of adding up the largest eigenvalues of the covariance matrixes of the scattering signals according to the weights, and $u_A$ and $u_S$ respectively indicate peaks of excitation signals and scattering signals of the corrosion.

14. The MUSIC corrosion monitoring method according to claim 3, wherein in step (7), a corrosion factor is calculated according to the following formula:

$$CI = \left(\frac{u_A}{u_S \times 10^5}\right)^2 \cdot \lambda_{max}$$

in the foregoing formula, $\lambda_m$, indicates a result of adding up the largest eigenvalues of the covariance matrixes of the scattering signals according to the weights, and $u_A$ and $u_S$ respectively indicate peaks of excitation signals and scattering signals of the corrosion.

15. The MUSIC corrosion monitoring method according to claim 4, wherein in step (7), a corrosion factor is calculated according to the following formula:

$$CI = \left(\frac{u_A}{u_S \times 10^5}\right)^2 \cdot \lambda_{max}$$

in the foregoing formula, $\lambda_{max}$ indicates a result of adding up the largest eigenvalues of the covariance matrixes of the scattering signals according to the weights, and $u_A$ and $u_S$ respectively indicate peaks of excitation signals and scattering signals of the corrosion.

16. The MUSIC corrosion monitoring method according to claim 5, wherein in step (7), a corrosion factor is calculated according to the following formula:

$$CI = \left(\frac{u_A}{u_S \times 10^5}\right)^2 \cdot \lambda_{max}$$

in the foregoing formula, $\lambda_{max}$ indicates a result of adding up the largest eigenvalues of the covariance matrixes of the scattering signals according to the weights, and $u_A$ and $u_S$ respectively indicate peaks of excitation signals and scattering signals of the corrosion.

\* \* \* \* \*